United States Patent
Phillips et al.

(10) Patent No.: US 8,708,859 B2
(45) Date of Patent: *Apr. 29, 2014

(54) MULTI-SPEED TRANSMISSION HAVING THREE PLANETARY GEAR SETS

(71) Applicant: GM Global Technology Operations LLC, Detroit, MI (US)

(72) Inventors: Andrew W. Phillips, Rochester, MI (US); Scott H. Wittkopp, Ypsilanti, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,735

(22) Filed: Jan. 31, 2013

(65) Prior Publication Data

US 2013/0143710 A1    Jun. 6, 2013

Related U.S. Application Data

(62) Division of application No. 12/840,904, filed on Jul. 21, 2010, now Pat. No. 8,376,892.

(51) Int. Cl.
   *F16H 3/62* (2006.01)

(52) U.S. Cl.
   USPC .................. 475/275; 475/323; 475/330

(58) Field of Classification Search
   CPC ............ F16H 2003/442; F16H 2200/0047; F16H 2200/0082; F16H 2200/201; F16H 2200/2041
   USPC ................. 475/275, 296, 323, 330
   See application file for complete search history.

(56) References Cited

U.S. PATENT DOCUMENTS

| | | | | |
|---|---|---|---|---|
| 6,231,471 | B1 * | 5/2001 | Park | 475/325 |
| 6,626,790 | B2 * | 9/2003 | Raghavan et al. | 475/277 |
| 6,645,118 | B2 * | 11/2003 | Bucknor et al. | 475/296 |
| 6,659,905 | B2 * | 12/2003 | Usoro et al. | 475/296 |
| 6,666,788 | B2 | 12/2003 | Bucknor et al. | |
| 6,695,741 | B2 * | 2/2004 | Raghavan et al. | 475/286 |
| 6,712,733 | B2 * | 3/2004 | Raghavan et al. | 475/296 |
| 6,716,133 | B2 * | 4/2004 | Raghavan et al. | 475/323 |
| 8,376,896 | B2 * | 2/2013 | Phillips et al. | 475/282 |
| 2003/0087721 | A1 * | 5/2003 | Raghavan et al. | 475/286 |
| 2003/0130083 | A1 | 7/2003 | Bucknor et al. | |
| 2009/0312139 | A1 | 12/2009 | Jang et al. | |
| 2011/0034288 | A1 | 2/2011 | Phillips et al. | |

* cited by examiner

*Primary Examiner* — Justin Holmes

(57) ABSTRACT

A transmission having an input member, an output member, three planetary gear sets, a plurality of coupling members and a plurality of torque transmitting devices. Each of the planetary gear sets includes first, second and third members. The torque transmitting devices include clutches and brakes.

17 Claims, 3 Drawing Sheets

| GEAR STATE | GEAR RATIO | RATIO STEP | TORQUE TRANSMITTING ELEMENTS | | | |
|---|---|---|---|---|---|---|
| | | | 32 | 30 | 28 | 26 |
| REV | -3.444 | | | X | | X |
| N | | -0.76 | | O | | |
| 1ST | 4.519 | | | X | X | |
| 2ND | 2.881 | 1.57 | X | X | | |
| 3RD | 1.792 | 1.61 | X | | X | |
| 4TH | 1.361 | 1.32 | X | | | X |
| 5TH | 1.000 | 1.36 | | | X | X |

X = ON - ENGAGED CARRYING TORQUE
O = ON - ENGAGED NOT CARRYING TORQUE
G = ON - GARAGE SHIFT ELEMENT ON AND CARRYING TORQUE

| GEAR STATE | GEAR RATIO | RATIO STEP | TORQUE TRANSMITTING ELEMENTS | | | |
|---|---|---|---|---|---|---|
| | | | 132 | 126 | 130 | 128 |
| REV | -5.368 | | X | X | | |
| N | | -1.17 | O | | | |
| 1ST | 4.592 | | X | | X | |
| 2ND | 2.663 | 1.72 | X | | | X |
| 3RD | 1.564 | 1.70 | | | X | X |
| 4TH | 1.298 | 1.20 | | X | | X |
| 5TH | 1.000 | 1.30 | | X | X | |

X = ON - ENGAGED CARRYING TORQUE
O = ON - ENGAGED NOT CARRYING TORQUE
G = ON - GARAGE SHIFT ELEMENT ON AND CARRYING TORQUE

MULTI-SPEED TRANSMISSION HAVING THREE PLANETARY GEAR SETS

CROSS-REFERENCE TO RELATED APPLICATIONS

This application is a divisional of U.S. application Ser. No. 12/840,904, filed on Jul. 21, 2010 which is hereby incorporated in its entirety herein by reference.

FIELD

The invention relates generally to a multiple speed transmission having a plurality of planetary gear sets and a plurality of torque transmitting devices and more particularly to a transmission having five or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In another embodiment of the present invention, the first, second and third planetary gear sets each having a sun gear, a carrier member and a ring gear.

In yet another embodiment of the present invention, the input member is continuously connected for common rotation with the ring gear of the third planetary gear set.

In yet another embodiment of the present invention, the output member is continuously connected for common rotation with the ring gear of the first planetary gear set and to carrier member of the second planetary gear set.

In yet another embodiment of the present invention, a first interconnecting member continuously interconnects the ring gear member of the first planetary gear set with the carrier member of the second planetary gear set.

In yet another embodiment of the present invention, a second interconnecting member continuously interconnects the carrier member of the first planetary gear set with a stationary member.

In yet another embodiment of the present invention, a third interconnecting member continuously interconnects the ring gear of the second planetary gear set with the carrier member of the third planetary gear set.

In still another embodiment of the present invention, a first torque transmitting mechanism is selectively engageable to interconnect the ring gear of the third planetary gear set and the input member with the sun gear member of the third planetary gear set.

In still another embodiment of the present invention, a second torque transmitting mechanism is selectively engageable to interconnect the sun gear of the second planetary gear set with the sun gear of the third planetary gear set.

In still another embodiment of the present invention, a third torque transmitting mechanism is selectively engageable to interconnect the sun gear of the first planetary gear set with the sun gear of the third planetary gear set.

In still another embodiment of the present invention, a fourth torque transmitting mechanism is selectively engageable to interconnect the sun gear of the second planetary gear set with the carrier member of the first planetary gear set and the stationary member.

In yet another embodiment of the present invention, the input member is continuously connected for common rotation with the ring gear of the third planetary gear set.

In yet another embodiment of the present invention, the output member is continuously connected for common rotation with the ring gear member of the second planetary gear set and to carrier member of the third planetary gear set.

In yet another embodiment of the present invention, the first interconnecting member continuously interconnects the carrier member of the first planetary gear set with the sun gear member of the second planetary gear set.

In still another embodiment of the present invention, a second interconnecting member continuously interconnects the ring gear of the second planetary gear set and the carrier member of the third planetary gear set with the output member.

In still another embodiment of the present invention, a first torque transmitting mechanism is selectively engageable to interconnect the sun gear of the first planetary gear set with the ring gear of the third planetary gear set and the input member.

In still another embodiment of the present invention, a second torque transmitting mechanism is selectively engageable to interconnect the carrier member of the first planetary gear set and the sun gear of the second planetary gear set with the sun gear of the third planetary gear set.

In still another embodiment of the present invention, a third torque transmitting mechanism is selectively engageable to interconnect the sun gear of the first planetary gear set with the sun gear member of the third planetary gear set.

In still another embodiment of the present invention, a fourth torque transmitting mechanism is selectively engageable to interconnect the carrier member of the second planetary gear set with a stationary member.

In still another embodiment of the present invention, the torque transmitting mechanisms are selectively engageable in combinations of at least two to establish at least five forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the five speed automatic transmission of the present invention have an arrangement of permanent mechanical connections between the elements of the three planetary gear sets. A first component or element of a first planetary gear set is permanently coupled to a second component or element of the second planetary gear set. A second component or element of the first planetary gear set is permanently coupled to a ground or stationary member. A first component or element of the second planetary gear set is permanently coupled to a second component or element of the third planetary gear set.

Figure 1:
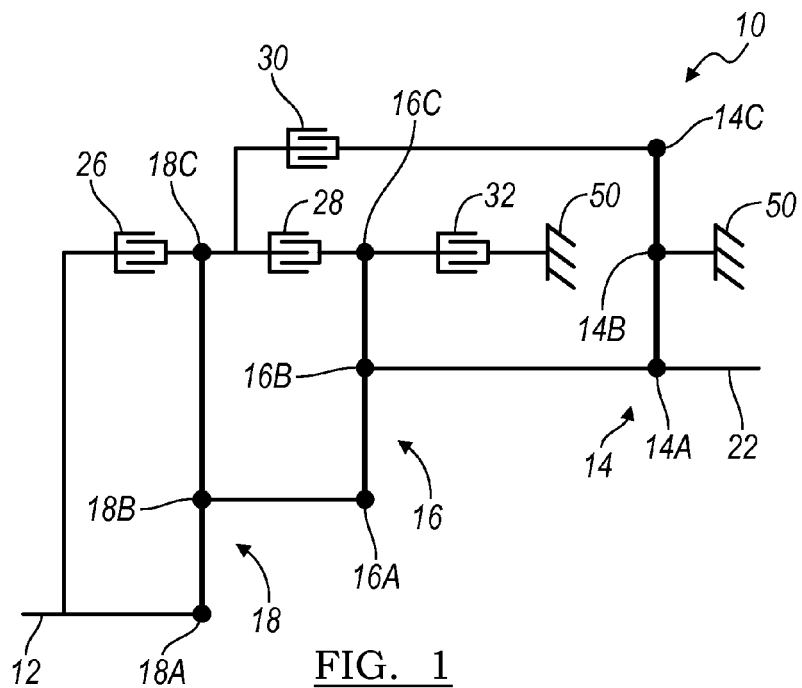
FIG. 1 is a lever diagram of an embodiment of a five speed transmission according to the present invention.

Referring now to FIG. 1, an embodiment of a five speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16 and a third planetary gear set 18 and an output shaft or member 22. In the lever diagram of FIG. 1, the the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C.

The input member 12 is continuously coupled to the first node 18A of the third planetary gear set 18. The output member 22 is coupled to the second node 14A of the first planetary gear set 14. The first node 14A of the first planetary gear set 14 is coupled to the second node 16B of the second planetary gear set 16. The second node 14B of the first planetary gear set 14 is coupled to a stationary member or transmission housing 50. The first node 16A of the second planetary gear set 16 is coupled to the second node 18B of the third planetary gear set 18.

A first clutch 26 selectively connects the first node 18A of the third planetary gear set 18 and the input member or shaft 12 with the third node 18C of the third planetary gear set 18. A second clutch 28 selectively connects the third node 18C of the third planetary gear set 18 with the third node 16C of the second planetary gear set 16. A third clutch 30 selectively connects the third node 14C of the first planetary gear set 14 with the third node 18C of the third planetary gear set 18. A brake 32 selectively connects the second node 16C of the second planetary gear set 16 with a stationary member or transmission housing 50.

Figure 2:
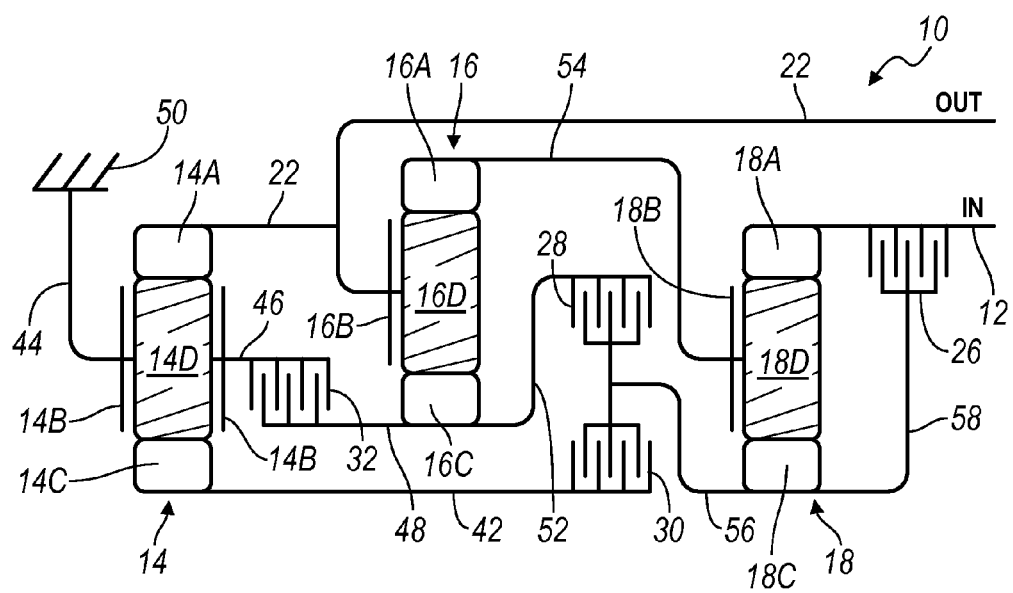
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with the output shaft or member 22. The planet carrier member 14B is connected to transmission housing 50 through a second shaft or interconnecting member 44 and a third shaft or interconnecting member 46. The planet gears 14D are each configured to intermesh with both the sun gear member 14C and the ring gear member 14A.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a fourth shaft or interconnecting member 48 and a fifth shaft or interconnecting member 52. The ring gear member 16A is connected for common rotation with the sixth shaft or interconnecting member 54. The planet carrier member 16B is connected for common rotation with the output shaft or member 22. The planet gears 16D are each configured to intermesh with both the sun gear member 16C and the ring gear member 16A.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a seventh shaft or interconnecting member 56 and an eighth shaft or interconnecting member 58. The ring gear member 18A is connected for common rotation with the input shaft or member 12. The planet carrier member 18B is connected for common rotation with the sixth shaft or interconnecting member 54. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brake 32 allow for selective interconnection of the shafts or interconnecting members, members of the planetary gear sets and the housing. For example, the first clutch 26 is selectively engageable to connect the input shaft or member 12 with the eighth shaft or interconnecting member 58. The second clutch 28 is selectively engageable to connect the fifth shaft or interconnecting member 52 with the seventh shaft or interconnecting member 56. The third clutch 30 is selectively engageable to connect the first shaft or interconnecting member 42 with the seventh shaft or interconnecting member 56. The brake 32 is selectively engageable to connect the fourth shaft or interconnecting member 48 with the stationary element or the transmission housing 50 in order to restrict the member 48 from rotating relative to the transmission housing 50.

Figures 3, 4:
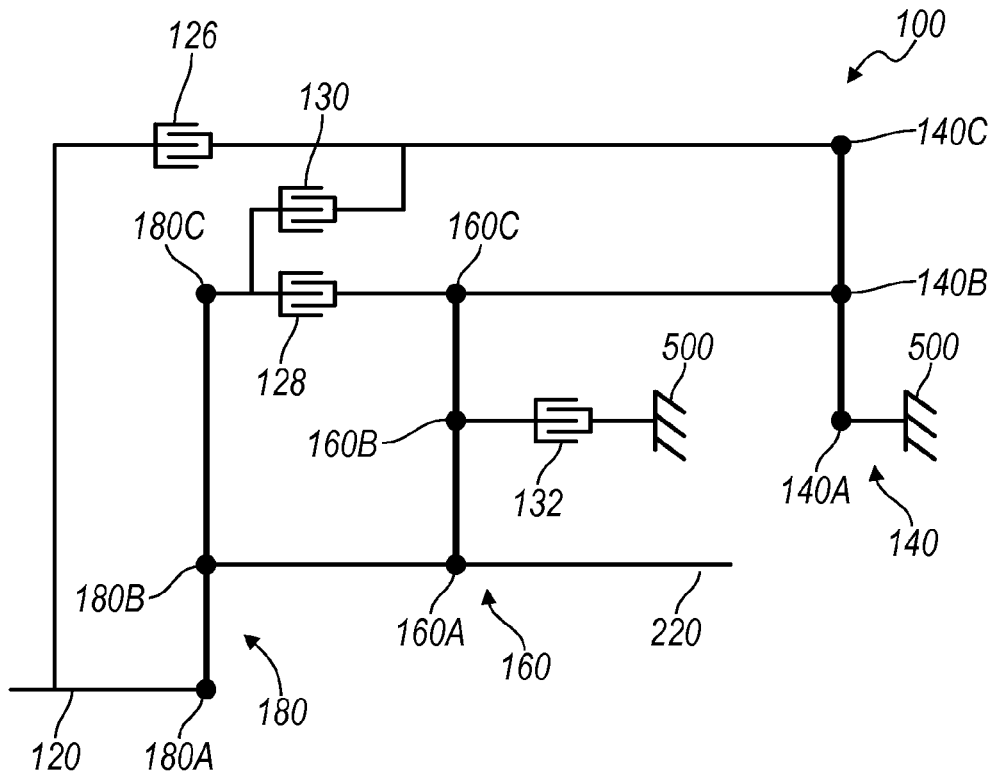
FIG. 3 is a truth table presenting the state of engagement of the various torque transmitting elements in each of the available forward and reverse speeds or gear ratios of the transmission illustrated in FIGS. 1 and 2.
FIG. 4 is a lever diagram of another embodiment of a five speed transmission according to the present invention.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30 and brake 32), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "0" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26 and third clutch 30 are engaged or activated. The first clutch 26 connects the input shaft or member 12 with the eighth shaft or interconnecting member 58. The third clutch 30 connects the first shaft or interconnecting member 42 with the seventh shaft or interconnecting member 56. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the present invention, a transmission 100 is provided and illustrated in lever diagram form in FIG. 4. Transmission 100 includes an input shaft or member 120, a first planetary gear set 140, a second planetary gear set 160 and a third planetary gear set 180 and an output shaft or member 220. In the lever diagram of FIG. 4, the first planetary gear set 140 has three nodes: a first node 140A, a second node 140B and a third node 140C. The second planetary gear set 160 has three nodes: a first node 160A, a second node 160B and a third node 160C. The third planetary gear set 180 has three nodes: a first node 180A, a second node 180B and a third node 180C.

The input member 120 is continuously coupled to the first node 180A of the third planetary gear set 180. The output member 220 is coupled to the first node 160A of the second planetary gear set 160 and a second node 180B the third planetary gear set 180. The second node 140B of the first planetary gear set 140 is coupled to the third node 160C of the second planetary gear set 160. The first node 140A of the first planetary gear set 140 is coupled to a stationary member or transmission housing 500.

A first clutch 126 selectively connects the first node 180A of the third planetary gear set 180 and the input member or shaft 120 with the third node 140C of the first planetary gear set 140. A second clutch 128 selectively connects the third node 160C of the second planetary gear set 160 with the third node 180C of the third planetary gear set 180. A third clutch 130 selectively connects the third node 140C of the first planetary gear set 140 with the third node 180C of the third planetary gear set 180. A brake 132 selectively connects the second node 160B of the second planetary gear set 160 with a stationary member or transmission housing 500.

Figures 5, 6:
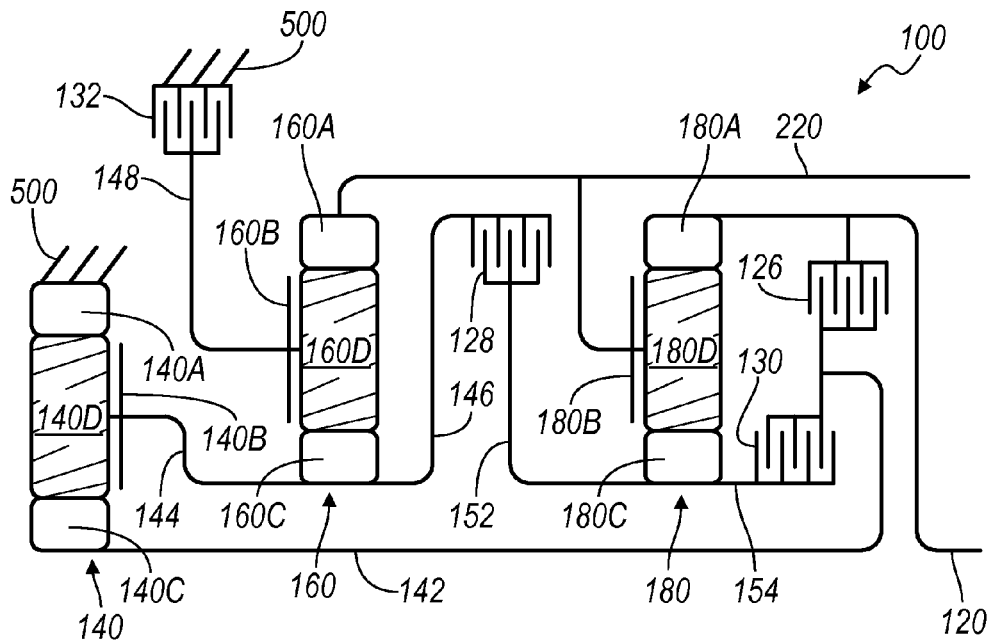
FIG. 5 is a diagrammatic illustration of another embodiment of a five speed transmission according to the present invention.
FIG. 6 is a truth table presenting the state of engagement of the various torque transmitting elements in each of the available forward and reverse speeds or gear ratios of the transmission illustrated in FIGS. 4 and 5.

Referring now to FIG. 5, a stick diagram presents a schematic layout of the embodiment of the five speed transmission 100 according to the present invention. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, the planetary gear set 140 includes a sun gear member 140C, a ring gear member 140A and a planet gear carrier member 140B that rotatably supports a set of planet gears 140D (only one of which is shown). The sun gear member 140C is connected for common rotation with a first shaft or interconnecting member 142. The ring gear member 140A is connected to a stationary member or transmission housing 500. The planet carrier member 140B is connected for common rotation with a second shaft or interconnecting member 144. The planet gears 140D are each configured to intermesh with both the sun gear member 140C and the ring gear member 140A.

The planetary gear set 160 includes a sun gear member 160C, a ring gear member 160A and a planet gear carrier member 160B that rotatably supports a set of planet gears 160D (only one of which is shown). The sun gear member 160C is connected for common rotation with the second shaft or interconnecting member 144 and a third shaft or interconnecting member 146. The ring gear member 160A is connected for common rotation with the output shaft or member 220. The planet carrier member 160B is connected for common rotation with a fourth shaft or interconnecting member 148. The planet gears 160D are each configured to intermesh with both the sun gear member 160C and the ring gear member 160A.

The planetary gear set 180 includes a sun gear member 180C, a ring gear member 180A and a planet gear carrier member 180B that rotatably supports a set of planet gears 180D (only one of which is shown). The sun gear member 180C is connected for common rotation with a fifth shaft or interconnecting member 152 and a sixth shaft or interconnecting member 154. The ring gear member 180A is connected for common rotation with the input shaft or member 120. The planet carrier member 180B is connected for common rotation with the output shaft or member 220. The planet gears 180D are each configured to intermesh with both the sun gear member 180C and the ring gear member 180A.

The input shaft or member 120 is continuously connected to an engine (not shown) or to a turbine of a torque converter (not shown) or input clutch (not shown). The output shaft or member 220 is continuously connected with the final drive unit or transfer case (not shown).

The torque-transmitting mechanisms or clutches 126, 128, 130 and brake 132 allow for selective interconnection of the shafts or interconnecting members, members of the planetary gear sets and the housing. For example, the first clutch 126 is selectively engageable to connect the input shaft or member 120 with the first shaft or interconnecting member 142. The second clutch 128 is selectively engageable to connect the third shaft or interconnecting member 146 with the fifth shaft or interconnecting member 152. The third clutch 130 is selectively engageable to connect the first shaft or interconnecting member 142 with the sixth shaft or interconnecting member 154. The brake 132 is selectively engageable to connect the fourth shaft or interconnecting member 148 with the stationary element or the transmission housing 500 in order to restrict the member 148 from rotating relative to the transmission housing 500.

Referring now to FIG. 4 and FIG. 5, the operation of the embodiment of the five speed transmission 100 will be described. It will be appreciated that transmission 100 is capable of transmitting torque from the input shaft or member 120 to the output shaft or member 220 in at least five forward speed or torque ratios and at least one reverse speed or torque ratio. Each forward and reverse speed or torque ratio is attained by engagement of one or more of the torque-transmitting mechanisms (i.e. first clutch 126, second clutch 128, third clutch 130 and brake 132), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, first clutch 126 and brake 132 are engaged or activated. The first clutch 126 connects the input shaft or member 120 with the first shaft or interconnecting member 142. The brake 32 connects the fourth shaft or interconnecting member 148 with the stationary element or the transmission housing 500 in order to restrict the member 148 from rotating relative to the transmission housing 500. Likewise, the five forward ratios are achieved through different combinations of clutch and brake engagement, as shown in FIG. 6.

It will be appreciated that the foregoing explanation of operation and gear states of the five speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
   an input member;
   an output member;
   first, second and third planetary gear sets each having first, second and third members, wherein the input member is continuously connected to the third planetary pear set and the output member is continuously connected to the third planetary gear set;
   a first interconnecting member continuously interconnects the second member of the first planetary gear set with the third member of the second planetary gear set;
   a second interconnecting member continuously interconnecting the second planetary gear set with the third planetary gear set; and
   four torque transmitting mechanisms each selectively engageable to interconnect at least one of the first, second, and third members with at least one other of the first, second, third members and a stationary member, and
   a first of the four torque transmitting mechanisms is selectively engageable to interconnect the second member of the first planetary gear set and the third member of the second planetary gear set with the third member of the third planetary gear set; and
   wherein the torque transmitting mechanisms are selectively engageable in combinations of at least two to establish at least five forward speed ratios and at least one reverse speed ratio between the input member and the output member.

2. The transmission of claim 1 wherein the second interconnecting member continuously interconnects the first member of the second planetary gear set with the second member of the third planetary gear set.

3. The transmission of claim 2 wherein a second of the four torque transmitting mechanisms is selectively engageable to interconnect the third member of the first planetary gear set with the first member of the third planetary gear set.

4. The transmission of claim 3 wherein a third of the four torque transmitting mechanisms is selectively engageable to interconnect the third member of the first planetary gear set with the third member of the third planetary gear set.

5. The transmission of claim 4 wherein a fourth of the four torque transmitting mechanisms is selectively engageable to interconnect the second member of the second planetary gear set with the stationary member.

6. The transmission of claim 1 wherein the input member is continuously connected for common rotation with the first member of the third planetary gear set.

7. The transmission of claim 6 wherein the output member is continuously connected for common rotation with the first member of the second planetary gear set and to second member of the third planetary gear set.

8. The transmission of claim 1 wherein the third member of the first planetary gear set, the third member of the second planetary gear set and the third member of the third planetary gear set are sun gears, the second members of the first, second and third planetary gear sets are carrier members and the first member of the first planetary gear set, the first member of the second planetary gear set and the first member of the third planetary gear set are ring gears.

9. A transmission comprising:
an input member;
an output member;
first, second and third planetary gear sets each having first, second and third members;
two interconnecting members continuously interconnecting at least one of the first, second, and third members of the first, second and third planetary gear sets with at least one other of the first, second, third members of the first, second and third planetary gear sets, and
a first torque transmitting mechanism that is selectively engageable to interconnect the third member of the first planetary gear set with the first member of the third planetary gear set;
a second torque transmitting mechanism that is selectively engageable to interconnect the second member of the first planetary gear set and the third member of the second planetary gear set with the third member of the third planetary gear set;
a third torque transmitting mechanism that is selectively engageable to interconnect the third member of the first planetary gear set with the third member of the third planetary gear set;
a fourth torque transmitting mechanism that is selectively engageable to interconnect the second member of the second planetary gear set with a stationary member, and
wherein the torque transmitting mechanisms are selectively engageable in combinations of at least two to establish at least five forward speed ratios and at least one reverse speed ratio between the input member and the output member.

10. The transmission of claim 9 wherein a first of the two interconnecting members continuously interconnect the second member of the first planetary gear set with the third member of the second planetary gear set.

11. The transmission of claim 10 wherein a second of the two interconnecting members continuously interconnects the first member of the second planetary gear set with the second member of the third planetary gear set.

12. The transmission of claim 9 wherein the input member is continuously connected for common rotation with the first member of the third planetary gear set.

13. The transmission of claim 12 wherein the output member is continuously connected for common rotation with the first member of the second planetary gear set and to second member of the third planetary gear set.

14. The transmission of claim 9 wherein the third member of the first planetary gear set, the third member of the second planetary gear set and the third member of the third planetary gear set are sun gears, the second members of the first, second and third planetary gear sets are carrier members and the first member of the first planetary gear set, the first member of the second planetary gear set and the first member of the third planetary gear set are ring gears.

15. A transmission comprising:
an input member;
an output member;
first, second and third planetary gear sets each having a sun gear, a carrier member and a ring gear;
a first interconnecting member continuously interconnecting the carrier member of the first planetary gear set with the sun gear member of the second planetary gear set;
a second interconnecting member continuously interconnecting the ring gear of the second planetary gear set with the carrier member of the third planetary gear set;
a first torque transmitting mechanism selectively engageable to interconnect the sun gear of the first planetary gear set with the ring gear of the third planetary gear set;
a second torque transmitting mechanism selectively engageable to interconnect the carrier member of the first planetary gear set and the sun gear of the second planetary gear set with the sun gear of the third planetary gear set;
a third torque transmitting mechanism selectively engageable to interconnect the sun gear of the first planetary gear set with the sun gear member of the third planetary gear set; and
a fourth torque transmitting mechanism selectively engageable to interconnect the carrier member of the second planetary gear set with a stationary member,
wherein the torque transmitting mechanisms are selectively engageable in combinations of at least two to establish at least five forward speed ratios and at least one reverse speed ratio between the input member and the output member.

16. The transmission of claim 15 wherein the input member is continuously connected for common rotation with the ring gear of the third planetary gear set.

17. The transmission of claim 16 wherein the output member is continuously connected for common rotation with the ring gear member of the second planetary gear set and the carrier member of the third planetary gear set.

* * * * *